Patented June 7, 1949

2,472,476

UNITED STATES PATENT OFFICE 2,472,476

ANTACID COMPOSITION

Leo L. Hardt, Chicago, Ill., assignor to Hardt Foundation, a nonprofit corporation of Illinois No Drawing. Application March 15, 1948, Serial No. 15,047

5 Claims. (Cl. 167—55)

The present invention relates to a pharmaceutical composition and more especially to a composition which is particularly adapted to the treatment of peptic ulcer.

Various antacid preparations have been employed in the treatment of hyperacidity, hypertrophic gastritis, and peptic ulcer, both of the duodenal and gastric type. One composition which has been widely used and which has many advantages over other antacids is aluminum hydroxide gel. This material is generally made by precipitating aluminum hydroxide as a gelatinous precipitate by adding ammonia to a solution of aluminum chloride. The resultant aluminum hydroxide gel has the appearance of a smooth, translucent cream and possesses a high surface area and adsorptive power, as well as being of amphoteric nature. Gastroscopic studies, however, show that the aluminum gel preparation does not adhere well to the lining of the stomach and does not have an effective coating action which is highly advantageous for protecting ulcers from the acids of the gastric juice.

In accordance with this invention I have discovered that by mixing gastric, animal mucin with aluminum hydroxide gel there is obtained a combination which, according to clinical and gastroscopic tests, approaches the ideal antacid in the treatment of hyperacidity, peptic ulcer and gastritis. The composition has the important advantage over the aluminum hydroxide gel compositions hitherto used in that it provides an effective coating of the mucosa and the ulcer. The adsorption and neutralization of the acids of the gastric juice also remains highly effective.

Various other antacid materials may be added to the mucin aluminum hydroxide gel composition. One material which has been found particularly suitable is magnesium trisilicate. The combination of aluminum hydroxide and magnesium trisilicate and animal mucin has a synergistic effect. Other antacid materials may be used with or in place of the magnesium trisilicate such as calcium carbonate and tribasic calcium phosphate. It is preferred, however, to use magnesium trisilicate.

The composition may be made in liquid or dry form. In addition to the active ingredients of the composition, I may use various inert solids, particularly when the composition is made in the dry form.

My composition may be conveniently used in the form of tablets. The tablets may be prepared by mixing the active ingredients (gastric animal mucin, aluminum hydroxide and magnesium trisilicate) with excipients (sugar, talc, cornstarch, binders (Stanodex), i. e., a mixture of maltose, soluble dextrine and small amount of other sugars, lubricants (calcium stearate) and flavoring oils (oil of peppetrmint, oil of fennel and methyl salicylate). The tablet may be prepared by processes well known in the pharmaceutical line, such as by "slugging" or by a wet granulation process. The tablet made by a dry granulation process which has been found to be particularly suitable has the following composition:

Per tablet

|  | Grains |
|---|---|
| Gastric animal mucin | 2.5 |
| Dried aluminum hydroxide gel | 4.0 |
| Magnesium trisilicate | 7.0 |

The percentage composition of the tablet is as follows:

|  | Per cent by weight |
|---|---|
| Gastric animal mucin | 12.5 |
| Dried aluminum hydroxide gel | 20.0 |
| Magnesium trisilicate | 35.0 |
| Inert materials including excipients, binders and lubricants | 32.5 |

When a wet granulation process is used the amounts of excipients are generally reduced. The following is a percentage composition of a tablet made by the wet granulation process:

|  | Per cent |
|---|---|
| Gastric animal mucin | 14.3 |
| Dried aluminum hydroxide gel | 22.8 |
| Magnesium trisilicate | 40.0 |
| Inert materials, including excipients, binders and lubricants | 22.0 |

The proportions of the various ingredients in my composition may be varied widely. The animal mucin may vary from 2% to 90% by weight, but preferably is from 5% to 50% by weight; aluminum hydroxide gel from 10% to 95%, but preferably from 15% to 80%; the magnesium trisilicate from 0 to 85%, but preferably from 10% to 65%, and the inert materials, such as excipients, lubricants and binders, from 0 to 85%, but preferably from 0 to 65% by weight.

A fluid composition which has given satisfactory results consists of 15% to 25% by weight of gastric animal mucin and 75% to 85% by weight of a fluid aluminum hydroxide gel containing 1% to 5% by weight of the solid aluminum hydroxide gel dispersed in water.

This application is a continuation in part of my application Serial No. 707,756, filed November 4, 1946 and now abandoned.

While there have been shown and described certain embodiments of the invention, it is to be understood that it is capable of many modifications. Changes, therefore, may be made without departing from the spirit and scope of the invention as described in the appended claims, in which it is the intention to claim all novelty inherent in the invention as broadly as possible in view of the prior art.

I claim:

1. A pharmaceutical composition for the treatment of peptic ulcer comprising a mixture of animal mucin from 2% to 90% by weight, aluminum hydroxide gel from 10% to 95% and magnesium trisilicate from 0 to 85%.

2. A pharmaceutical composition for the treatment of peptic ulcer comprising a mixture of animal mucin from 5% to 50% by weight and aluminum hydroxide gel from 10% to 80%.

3. A pharmaceutical composition for the treatment of peptic ulcer comprising a mixture of animal mucin from 5% to 50% by weight and aluminum hydroxide gel from 10% to 80% and magnesium trisilicate from 10% to 65%.

4. A pharmaceutical composition for the treatment of peptic ulcer comprising animal mucin 12.5%, aluminum hydroxide gel 20.0% and magnesium trisilicate 25%.

5. A pharmaceutical composition for the treatment of peptic ulcer comprising animal mucin 14.3%, aluminum hydroxide gel 22.8% and magnesium trisilicate 40.0%.

LEO L. HARDT.

REFERENCES CITED

The following references are of record in the file of this patent:

UNITED STATES PATENTS

| Number | Name | Date |
| --- | --- | --- |
| 2,095,259 | Kober | Oct. 12, 1937 |

OTHER REFERENCES

Goodman and Gilman—Pharmacological Basis of Therapeutics. 1941. Page 790. Copy in Division 43.

Gutman—Modern Drug Encyclopedia. 2nd ed., (1941), pages 26, 321. Copy in Division 43.

Extra Pharamacopoeia, Vol. 1, 22nd ed. (1941). Pages 173, 174, 579. Copy in Division 43.

New Modern Drugs. Jan. 1941. First Supplement. Page 12. Copy in Division 43.